United States Patent Office 2,815,269
Patented Dec. 3, 1957

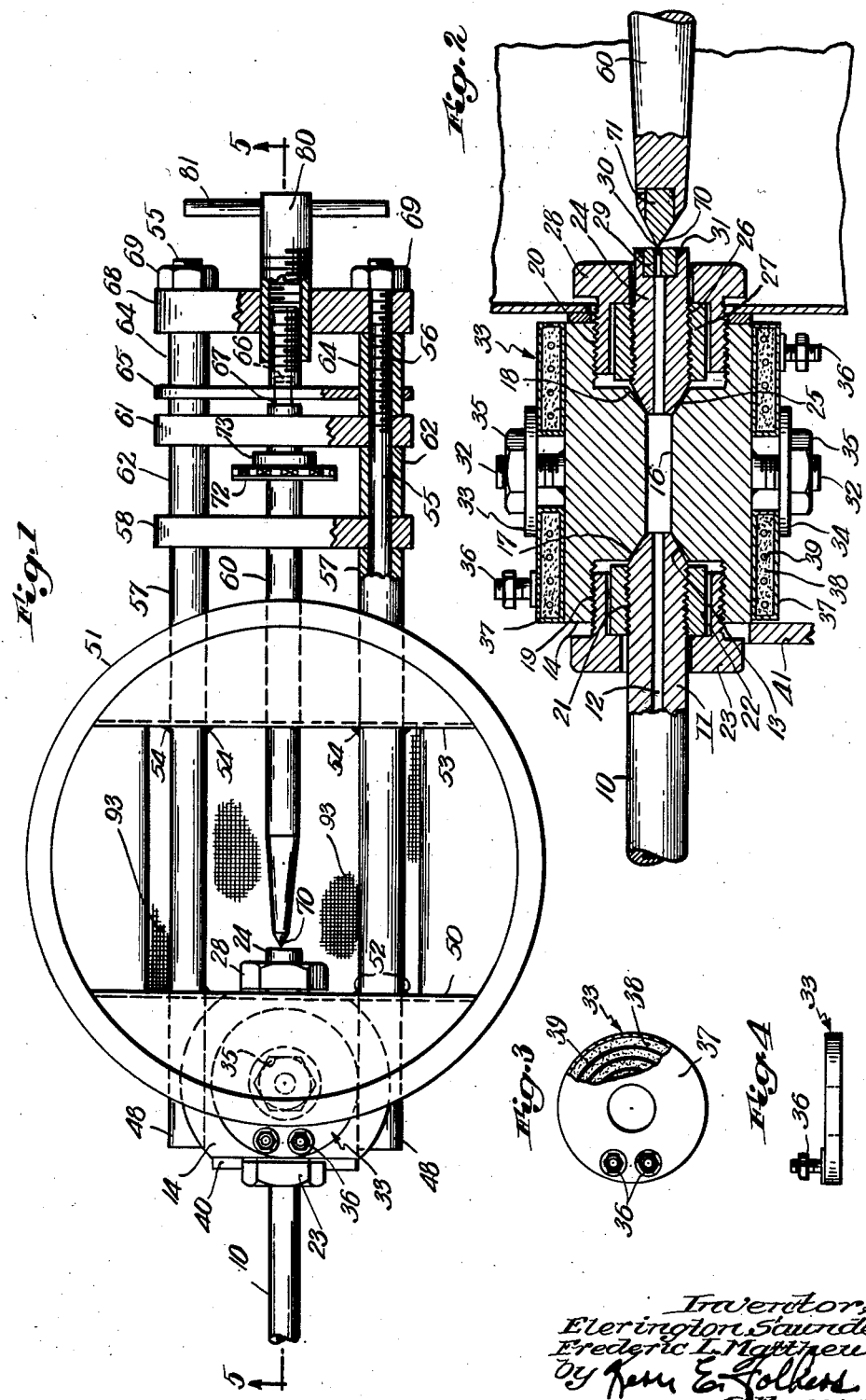

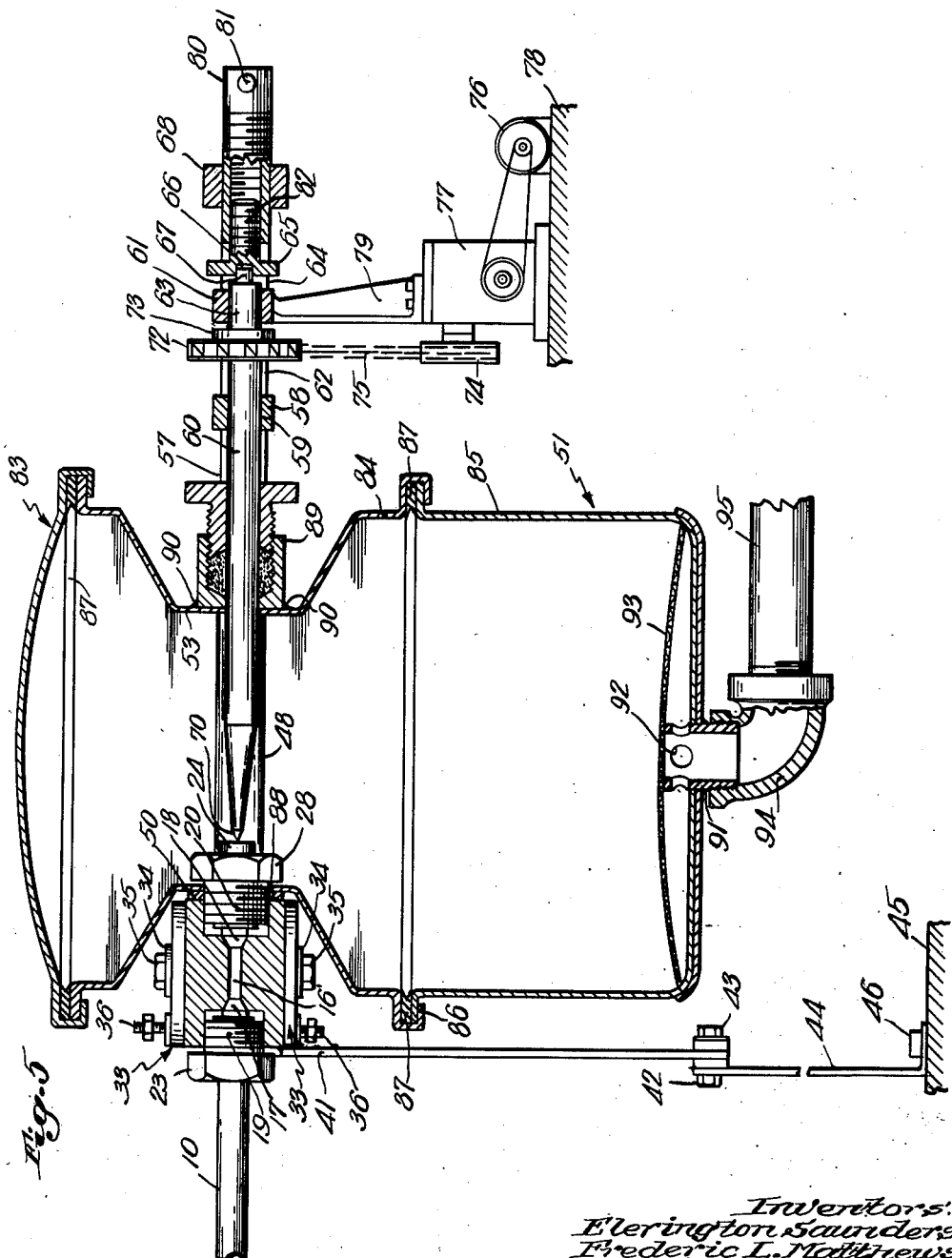

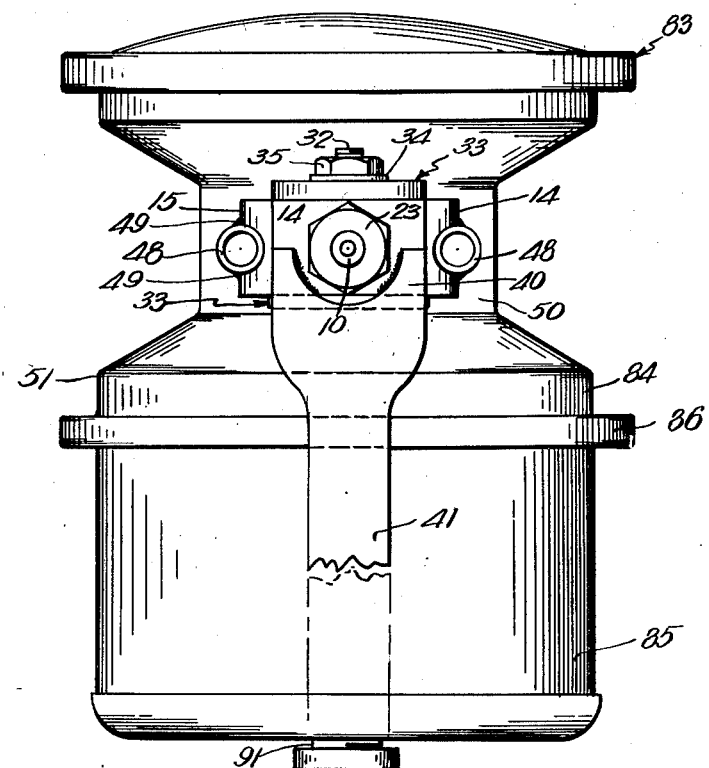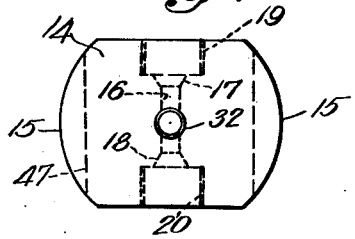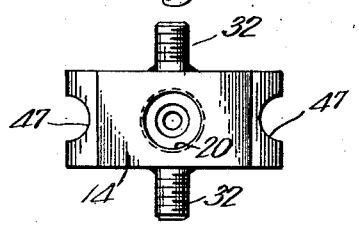

2,815,269

GAS RELEASING DEVICE AND METHOD

Elerington Saunders, Somerville, Mass., and Frederic L. Matthews, Moorestown, N. J., assignors to Monsanto Chemical Company, St. Louis, Mo., a corporation of Delaware Application June 22, 1955, Serial No. 517,212

6 Claims. (Cl. 23—290)

The present invention relates to an improved method and device for releasing gases from a high pressure and high temperature zone in which such gases are confined, and it more particularly relates to an improved method and let-down valve for releasing gases obtained by heating urea or mixtures of urea and ammonia at high temperatures and superatmospheric pressures in a reaction zone in the preparation of melamine, and for recovering solid substances from such gases.

Several methods and devices have been proposed heretofore for recovering melamine from a high pressure and high temperature reaction zone while maintaining the substances in the reaction zone at the desired pressure and temperature. For example, it has been proposed heretofore in the manufacture of melamine from urea to inject water under pressure directly into a reactor tube containing the gaseous and molten reaction products obtained by heating urea and ammonia at elevated temperatures and superatmospheric pressures and then releasing the water and products dissolved therein through a conventional valve. This procedure is not entirely satisfactory since the water solution of melamine thus obtained must be processed to recover the melamine in dry form.

It has also been proposed heretofore to release the hot reaction gases, including melamine vapor, from a reactor tube in which gaseous products are formed by heating a mixture of ammonia and urea at a temperature in excess of 350° C. and at a pressure above 750 pounds per square inch, which conditions are used to maintain the melamine in the vapor state, by means of a spring-loaded adjustable valve which is provided with a valve stem having a tapered tip which seats in a tapered orifice in the reactor tube. Such an arrangement is not entirely satisfactory since the contents of the reactor tube must be maintained at higher temperatures and lower pressures than are ordinarily desired in order to maintain the melamine in the vapor state. Moreover, the valve tip and orifice erode rapidly, especially when the gaseous vapors also contain liquid or molten materials, with the result that the valve tip and orifice must be replaced or repaired frequently. Thus, it is not possible to operate the reactor continuously for extended periods of time and still maintain the desired conditions of pressure and temperature in the reactor tube.

It is accordingly one object of this invention to provide a method of continuously releasing hot gases, particularly hot gases containing liquids and/or molten materials which are solid at room temperatures, over an extended period of time from a high pressure and high temperature zone so that the high pressure and high temperature conditions in such zone can be maintained substantially constant.

It is a further object of this invention to provide a method of continuously releasing hot gases containing molten melamine over an extended period of time from a reaction zone in which the melamine is present in a gaseous or molten state so that the melamine can be recovered directly in the solid state, while maintaining the desired pressure and temperature conditions in such reaction zone.

It is a further object of this invention to provide a device, including a let-down valve, for continuously releasing hot gases from a pressure-resistant container over extended periods of time while maintaining the desired temperature and pressure conditions in such container.

Still further objects and advantages of this invention will appear in the following description when considered in connection with the accompanying drawings, and the appended claims.

The device for releasing hot gases in accordance with the present invention comprises, in general, a pressure-resistant hollow container such as, for example, a pressure-resistant tube, in which hot gases are generated, having a cylindrical insert or valve seat, provided with a circular orifice, in one end thereof which orifice communicates with the bore of such tube. The insert or valve seat is constructed of a very hard substance, preferably cemented tungsten carbide. The device is also provided with a rotatable valve stem having a tapered tip of a very hard substance such as cemented tungsten carbide, which tip is positioned adjacent to the valve seat and is adapted to seat in the valve seat and completely close the orifice therein, if so desired, or to provide in combination with the valve seat an annular opening or orifice of the desired dimensions. The longitudinal axis of the valve stem is substantially coincident with or substantially coaxial with the longitudinal axis of the valve seat orifice. The valve stem is supported externally of the pressure-resistant container. In one embodiment of this invention, the device is provided with rigidly supported elongated metal members, which may be fastened to the container, positioned on opposite sides of the valve stem and having longitudinal axes which are parallel to the valve stem and lie in the same plane as the longitudinal axis of the valve stem and orifice. These members may be tubular or solid bars or rods. At least two cross-members are slidably mounted on such elongated members and are spaced apart and parallel to each other by spacer members which are removably mounted on such elongated members. The cross-members provide bearing surfaces for the valve stem and retain the valve stem in position but do not prevent movement of the valve stem along its longitudinal axis. Removable means are provided at the end of the elongated members and such means retain the cross-members and spacer members in position during operation of the device. Detachable means for continuously rotating the valve stem are also provided. The device is also provided with detachable means for adjustably moving the valve stem toward the valve seat, the valve stem being pressed away from the valve seat by hand or by the pressure of the hot fluid issuing from the valve seat orifice when such means are retracted. In a preferred embodiment of this invention, such means is removably mounted on the elongated metal members and is readily removed from the elongated members on removal of the removable means at the ends of the elongated members. The device may also be provided with means for sealing the container except for the orifice in the valve seat, means for heating the container or tube and means for supplying suitable materials to such container.

The method of releasing hot gases from a high pressure and high temperature zone containing such gases comprises, in general, continuously heating such gases in the high pressure and high temperature zone thereby maintaining the gases in the zone at the desired pressure and temperature, continuously releasing the gases in such zone between the wall of a cylindrical passageway and a rotating conical surface, the longitudinal axis of which is substantially coincident with the longitudinal axis of such cylindrical passageway, and continuously supplying hot gases to the high pressure and high temperature zone, the clearance between the wall of the cylindrical passageway and the rotating conical surface being adjusted to maintain the desired pressure and temperature in such zone.

In the accompanying drawings, forming a part of this specification, and in which like numerals are employed to designate like parts throughout the specification and drawings, Figure 1 is a plan view of a gas releasing and material collecting device embodying the present invention, Figure 2 is an enlarged central vertical longitudinal section of a let-down valve, Figure 3 is a plan view of an electric heating element for heating gases in the let-down valve, Figure 4 is a side elevation of such electric heating element, Figure 5 is a central vertical longitudinal section taken along the line 5—5 of Figure 1, Figure 6 is an end view of the gas releasing and material collecting device of Figure 1, Figure 7 is a plan view of the valve body block of the let-down valve, and Figure 8 is a side elevation of such valve body block.

In the drawings, wherein for the purpose of illustration, is shown a preferred embodiment of the present invention, the numeral 10 designates a pressure-resistant container or reactor tube. The container or reactor tube 10 shown in the drawings has a relatively thick wall 11 and a relatively small central cylindrical passage 12. Gases, liquids or molten materials or mixtures thereof, which are to be reacted in the tube, are supplied to one end of tube 10 under positive pressure, as for example, by means of a pump (not shown), and the tube is heated by some suitable means by an external flame, steam, electric heating elements or the like (not shown), the tube being heated to a temperature above 150° C. so that gases will be formed under superatmospheric pressure. The discharge portion of the tube 10 is provided with a tapered portion 13 preferably having a taper of about 59°, which portion terminates inside of a let-down valve body block 14 which is provided with rounded end portions 15, as illustrated in Figure 7. The block 14 is provided with a central longitudinal cylindrical bore 16 of larger diameter than the cylindrical passage 12 of tube 10, which bore communicates at each end thereof with tapered bores 17 and 18, respectively, each preferably having a taper of about 60°. Each of the tapered bores 17 and 18 in turn communicate with relatively large cylindrical bores 19 and 20, respectively, which are internally threaded. The partially tapered portion 13 of tube 10 abuts against the tapered side wall of bore 17. The discharge portion of tube 10 is provided with an external thread 21 on which is screwed an annular collar 22. Numeral 23 designates a gland nut having a hexagonal head and an internal flange, and which is adapted to slide along tube 10 and collar 22. Gland nut 23 screws into bore 19 of the block 14 and the internal flange of the nut bears against the collar 22 and forces the tapered portion 13 of tube 10 against the side wall of tapered bore 17 of the block 14. Thus, a gas tight fit is provided between the tube 10 and the block 14 and the cylindrical passage 12 of tube 10 is maintained in communicative relationship with the bore 16 in the block 14.

The numeral 24 represents a cylindrical tube one end of which is provided with a tapered portion 25 which abuts against the side wall of tapered bore 18, the tube 24 having an external thread 26 on which is screwed an annular collar 27. A gland nut 28 having a hexagonal head and an inner flange slides over the collar 27 and tube 24 and screws into the bore 20 of block 14 with the inner flange of the nut abutting against the collar 27 thereby causing the tapered portion 25 of tube 24 to abut firmly against the side wall of the tapered bore 18. The opposite end of tube 24 is bored and countersunk to accommodate a cylindrical insert or valve seat 29 which has a central cylindrical passage therein of smaller diameter than the cylindrical passage in tube 24 but communicating with the passage in tube 24. The passage in insert 29 terminates in an orifice 30. The insert 29 which serves as a valve seat, is made from a very hard and tough alloy such as cemented tungsten carbide, and is firmly held in tube 24 by a tapered brazed joint 31.

The block 14 is also provided with studs 32 which are welded to the block. Numeral 33 designates electric ring heating elements (for example, ring heating elements sold under the trade name Chromalox by the Edwin L. Wiegand Company of Pittsburgh, Pennsylvania, U. S. A.) which are firmly held against the top and bottom of the block, respectively, by washers 34 and nuts 35, the latter being screwed on studs 32. Each heating element 33 is provided with two terminals 36, the terminals of each element being connected together in parallel and to a source of variable voltage by means of suitable wire or cable (not shown). The heating elements 33, as shown in Figures 2, 3 and 4, comprise an outer cylindrical shell 37 which surrounds an insulating composition 38 in which is embedded a wire resistor 39 arranged in a spiral, each end of the wire resistor being connected to one of the terminals 36 hereinbefore referred to. When electric current is caused to flow through the wire resistor in the heating elements 33 heat is generated in the heating elements which heat the block 14 and the tube 24. By varying the voltage supplied to heating elements 33 is required it is possible to maintain the gases in bore 16 and in the central cylindrical passage in tube 24 at the same temperatures as the gases in the central passage of tube 10. The entire let-down valve body assembly illustrated in Figure 2 thus comprises two cone joints and a valve body which are capable of being heated to relatively high temperatures.

The block 14 is welded or otherwise fastened to the U-shaped portion 40 of a rigid rectangular strip 41 which is in turn bolted by means of studs 42 and nuts 43 to a rigid L-shaped strip 44, the latter strip being fastened to a suitable rigid base 45 by means of one or more screws 46.

The rounded ends 15 of block 14 are provided with semi-circular horizontal channels 47, as illustrated in Figures 6, 7 and 8, which accommodate tubular members 48, the tubular members being joined to the block 14 by welds 49 and extending parallel to each other and to the bore 16 of block 14. The longitudinal axis of each tubular member 48 is in the same plane as the longitudinal axis of the bore 16 and the insert 29. The tubular members 48 extend through circular openings in the vertical straight wall 50 of a container which is designated generally by the numeral 51, the tubular members being joined to the wall 50 by welds 52. The tubular members 48 extend through the container 51 and terminate at the other vertical straight wall 53 of the container 51, and are fastened to wall 53 by welds 54. Solid rods 55, which are provided with external threads 56, are joined to the inner walls of the tubular members 48 by a weld (not shown) so that they are parallel to each other and form a continuation of the tubular members.

The rods 55 are provided with spacer sleeves 57 which are of equal length and serve to space the cross-member or guide 58 at a fixed and predetermined distance from the wall 53 of container 51. The cross-member is slideably mounted on rods 55 and is provided with a hole which serves as one bearing surface 59 for the valve stem 60. Cross-member 58 thus serves two functions. First it serves to keep the rods 55 in parallel alignment and also serves as a bearing surface for the valve stem 60.

The cross-member 58 is spaced from a similar cross-member or guide 61 by means of spacer sleeves 62 which are of equal length. The cross-member 61, which is slideably mounted on rods 55 serves the same functions as cross-member 58, that is, it serves to maintain the rods 55 in parallel alignment and also provides a bearing surface 63 for the valve stem 60. The cross-member is held up against the collars of spacer sleeves 62 by means of spacer sleeves 64 which are internally threaded and are screwed on the rods 55. Another cross-member or guide 65 is slideably mounted on the sleeves 64, and is provided with a cylindrical opening 66 which serves as a bearing surface for the thrust bearing pivot 67 at the end of valve stem 60. Still another cross-member or guide 68, which is slideably mounted on rods 55, is held in position up against the collars of sleeves 64 by means of removable means such as nuts 69 which are screwed on rods 55.

The valve stem 60 which has been referred to above is substantially cylindrical except for the valve tip portion which tapers gradually near the end thereof finally terminating in a sharp-pointed conical tip 70. As is illustrated in Figure 2, the valve stem 60 is provided with a cylindrical insert 71 which terminates in the sharp-pointed conical tip 70. This cylindrical insert with the conical tip is made from a very hard and tough alloy such as, for example, cemented tungsten carbide.

The longitudinal axis of the valve stem 60 is substantially horizontal and is parallel to the longitudinal axis of the tubular members 48 and the rods 55, and is also substantially coincident with the longitudinal axis of the cylindrical insert 29. The valve stem is supported by the bearing surface 59 in cross-member 58, and the bearing surface 63, in cross-member 61.

It will be seen from the foregoing, that the device of this invention is provided with rigidly supported elongated metal members which may be hollow or solid bars or rods such as tubular members 48 and rods 55, which members are positioned on opposite sides of valve stem 60 and are parallel thereto. The longitudinal axis of each elongated member lies in the same plane as the longitudinal axis of valve setm 60 and bore 16 or orifice 30.

The valve stem 60 is provided with detachable means for continuously rotating the valve stem during operation of the device. Such means preferably comprise a sprocket 72 having hub 73, the sprocket being removably fastened to the valve stem 60 by a set screw on the hub (not shown). The sprocket is connected to a second sprocket 74 by an endless roller chain 75, the sprocket 74 being driven by means of an electric motor 76 through a gear box 77. The valve stem is continuously rotated by means of this sprocket and chain drive. The gear box and electric motor are fastened to a suitable base 78. The top of the gear box serves as a base for the supporting member 79, which is detachably fastened to cross-member 61. This supporting member prevents the up and down movement of the valve stem due to the vibration of the sprocket and chain drive.

Normally, the valve stem would be forced away from the orifice 30 due to the pressure of hot gases escaping from the reactor tube 10 through such orifice. In order to prevent this movement of the valve stem away from the orifice and in order to obtain the proper clearance between the orifice 30 and the conical valve tip 70 a detachable means or mechanism is provided which will prevent the backward movement of the valve stem along its longitudinal axis and to provide the proper clearance for the release of hot gases from the orifice 30. This mechanism, which adjustably moves the valve stem toward the valve seat, preferably comprises a cylindrical tubular member 80 which is provided with a handle 81 for turning the tubular member, the tubular member being internally and externally threaded. The tubular member screws into an internally threaded opening in the cross-member 68 and engages an externally threaded stud 82 which is welded to the cross-member 65. The external thread of the stud 82 and the internal thread of the tubular member 80 have the same pitch, but the external thread on the tubular member 80 has two less threads per inch.

As the tubular member is screwed into the cross-member 68, the internal thread of the tubular member engages the external thread of the stud which moves the cross-member 65 very slowly toward the end of the valve stem 60 due to the slight difference in pitch of the external thread on tubular member 80, and the internal thread of tubular member 80 and external thread of stud 82. The cross-member 65 thus finally bears against the end of the valve stem and moves the tip of the valve stem toward the orifice 30 of the tube 24. In this manner, the clearance between the orifice 30 and the tip 70 of the valve stem is adjusted, as desired, to release hot gases from the reactor tube 10 and yet maintain the pressure and temperature of the gases in the reactor tube 10 at operating conditions. Moreover, the orifice may be completely closed when required. The valve stem 60 is prevented from moving away from the orifice 30 by the cross-member 65. The valve stem may be moved away from the orifice 30 by partly unscrewing the tubular member 80 which moves the cross-member 65 away from the valve stem. Under these conditions the hot gases issuing from the orifice 30 will push the valve stem away from the orifice. The valve stem may also be moved longitudinally away from the orifice by hand.

The container 51, which has been referred to previously, comprises a top portion 83, a central portion 84 and a bottom portion 85. The top portion of the container is not shown in Figure 1. The top and bottom portions of the container are fastened to the central portion of the container by quick-release interrupted thread closures 86, commonly found in domestic pressure cookers, which are sealed by gaskets 87. The central portion of the container is separated from the block 14 by an annular gasket 88, preferably made of asbestos, and is provided with a packing gland 89 for the valve stem 60 so that gases in the container will not leak out of the container along the valve stem, the packing gland being fastened to the container by welds 90. The bottom portion of the container is provided with a centrally positioned vertical cylindrical tube 91 the top of which is closed and the bottom portion of which is externally threaded. This tube is provided with four holes 92 which are spaced 90° apart and open into the bottom portion of the container. A circular convex screen 93 is positioned over the top of tube 91 so that the central portion of the screen rests on the top of the tube and the edges of the screen rest on the bottom of the container. An elbow 94 is screwed to the tube and a pipe 95 is screwed into the elbow.

The container 51 is normally closed during the period that gases are released from the orifice 30 except for the outlet in the bottom of the container through the holes in tube 91. Due to the high pressure of the gases released from the orifice 30, the gases in the container are slightly above atmospheric pressure. Any liquid or gaseous materials in the gases issuing from orifice 30 which solidify due to the cooling of the released gas, are retained by the screen 93 and the gases leave the container through the holes in tube 91 and the pipe 95. Separation of entrained solids or liquids from the released gases may also be effected by a suitable cyclone separator (not shown).

The operation of the gas releasing and material collecting device is as follows:

The orifice 30 in the let-down valve body assembly shown in Figure 2, is first sealed by screwing the tubular member 80 into the cross-member 68 until the tip of the valve stem 60 is completely seated in the orifice. The reactor tube 10 is then heated to the desired operating temperature and the gases, liquids or molten solids which are to be reacted in the tube are pumped into the tube under positive pressure. The tube is then maintained at the desired operating temperature. The valve body block 14 is also heated at the same time by means of the electric heating elements 33 until the block is at the same temperature, and preferably at a higher temperature, than the reactor tube. When the desired operating pressure of the gaseous products in the tube has been attained, which is above 400 pounds per square inch (gauge), the orifice 30 is opened slightly by unscrewing the tubular member 80 from cross-member 68 and at the same time the valve stem 60 is caused to rotate continuously about its longitudinal axis by starting the electric motor 76 which drives the chain 75 by means of sprocket 74 through the gear box 77. When tubular member 80 is slightly retracted by partially unscrewing it from the cross member 68, the cross-member 65 is also retracted and there is nothing to prevent the backward movement of the valve stem 60 away from the orifice. The force of the gas pressure in the orifice 30 forces the valve stem away from the orifice until the end of the valve stem abuts against the cross-member 65. The clearance between the valve tip 70 and the wall of the orifice 30 is then adjusted by turning the tubular member 80 in the proper direction until the pressure of the gases in the reactor tube is maintained at the desired operating pressure.

Fresh gases, liquids or molten materials which are to be reacted are continuously pumped into the reactor tube 10 to maintain a continuous reaction mixture and thus provide a more or less constant reaction pressure in the reactor tube.

The hot gases escaping through the orifice 30 are confined in the container 51 and eventually leave the container by passing through the screen 93 and the holes 92 in the tube 91 and thence through pipe 95. Since the hot gases are under superatmospheric pressure in the reactor tube 10 and in the valve body block 14, and the gases in the container are only slightly above atmospheric pressure, the gases passing between the walls of the orifice 30 and valve tip 70 undergo a marked expansion and thus are cooled considerably. Consequently, any liquid or gaseous products which have a relatively high melting point solidify in the form of particles due to the cooling effect of the expanding gases and eventually settle on the fine mesh screen 93. When the bottom portion 85 of the container 51 is full of collected solid materials, the entire bottom portion is removed and is replaced by a similar bottom portion without interrupting the operation of the gas releasing mechanism or the reactor tube.

By using the apparatus shown in the drawings and described above, it is possible to continuously react gases, liquids or molten materials which form gaseous reaction products in a reactor tube at elevated temperatures and superatmospheric pressure and continuously release hot gases containing suspended materials which are solid at room temperature, preferably at a temperature below 200° C. from the reactor tube to collect solid reaction products from such gases over extended periods of time while maintaining the proper temperature and pressure conditions in the reactor tube. Since the eroding action of the hot gases and suspended material therein on the walls of the orifice 30 and valve tip 70 is substantially constant over the entire area of these parts due to the rotation of the valve stem, it is possible to operate the apparatus for long periods of time, for example, in the manufacture of melamine from urea for a period of 60 to 100 hours, without shutting down the apparatus to repair or replace the valve stem or orifice. This is of primary importance in continuous chemical processes.

Moreover, the device is readily disassembled to remove the valve stem 60 when desired for replacement or repairs. Thus, by removing the removable means, that is, the nuts 60, at the end of the elongated metal members such as rods 55 it is possible to slide off the mechanism for adjustably moving the valve stem, remove the spacer members such as 64 and 62 and the cross-member 61 and finally slide off the sprocket 72 and slide out the valve stem 60.

Although the drawings and the above descriptive matter relate to a gas releasing device which embodies a valve body block 14 for heating and directing hot gases from the reactor tube to an orifice 30, which in itself is not a part of the reactor tube, it is to be understood that the present invention is not limited to the particular device illustrated in the drawings and particularly described above. Thus, it is possible to provide the reactor tube with a cylindrical insert similar to the cylindrical insert 29 having an orifice 30 which serves as a valve seat for the tip of the valve stem 60 thereby eliminating the valve body block 14. Such an arrangement is not as suitable as the valve body arrangement illustrated in the drawings, however, since on failure of the cylindrical insert 29 due to erosion by the hot gases the entire reactor tube must be replaced, whereas only the cylindrical tube 24 in the valve body assembly of Figure 2 or the valve stem has to be replaced in the device illustrated in the drawings and this is readily accomplished without replacing the reactor tube.

As was pointed out previously herein the cylindrical insert 29 in the valve body assembly, illustrated in Figure 2, and the valve tip 70 of the valve stem 60 should be made from a very hard and tough alloy such as, for example, tungsten carbide. This is necessary to prevent excessive erosion of the walls of insert 29 and the valve tip 70 due to the high pressure of the hot gases released through the orifice 30. Very hard substances other than tungsten carbide may be used. However, the substance used must not only be hard but must be tough otherwise it will chip. For example, alloys consisting primarily of cobalt and containing minor proportions of chromium and tungsten and having a Rockwell hardness between C–17 and C–62 have presently been found to be unsatisfactory because of chipping.

The apparatus of this invention is particularly suitable for continuously releasing the hot reaction gases and liquids formed by continuously supplying molten urea or a mixture of molten urea and ammonia to a reactor tube in which the mixture of urea and ammonia is heated to a temperature above 350° C. and a pressure above 2000 pounds per square inch, preferably a temperature within the range of 375 to 600° C. and a pressure within the range of 2500 to 5000 pounds per square inch. Under such conditions melamine is formed and is present in the hot reaction gases, which include ammonia and carbon dioxide, partly in the vapor state and primarily in the molten or liquid state. The hot gases are continuously released through the annular orifice, formed by the walls of the orifice 30 and the rotating valve tip 70, having an area equivalent to an orifice having a diameter between about 0.006 and 0.0015 inch without changing the temperature and pressure conditions in the reactor tube. The hot gases released from the annular orifice expand and are thereby cooled. As a result of the cooling of the gases the melamine cools below its melting point, which is about 354° C. at atmospheric pressure, and solidifies in the form of fine particles. The particles are collected in the container 51 and the gaseous products are allowed to escape through the pipe 95.

Various modifications and changes may be made in the apparatus and methods described herein as will be apparent to those skilled in the art to which the present invention appertains without departing from the spirit and intent of this invention. Accordingly, it is to be understood that it is not intended to restrict the present invention except by the scope of the appended claims.

This application is a continuation-in-part of our co-pending application Serial No. 244,672, filed August 31, 1951, now abandoned.

What is claimed is:

1. A device for continuously releasing from a pressure-resistant container hot fluids which are under high pressure and which contain materials that are solid at room temperatures comprising a pressure-resistant hollow container, said container being provided with a valve seat having a circular orifice which communicates with the hollow portion of said container, a rotatable valve stem positioned externally of said container and valve seat and having a tapered tip of circular cross-section positioned adjacent said valve seat, the longitudinal axis of said valve stem being substantially coincident with the longitudinal axis of said valve seat orifice, detachable means for continuously rotating said valve stem about its longitudinal axis, detachable means for adjustably moving the tip of the valve stem toward said valve seat, said valve stem being pressed away from said valve seat by the fluid pressure in said container when said stem moving means is retracted, rigidly supported elongated metal members on opposite sides of said valve stem positioned parallel to said valve stem, the longitudinal axis of said members lying in the same plane as the longitudinal axis of the said valve stem and orifice, at least two cross-members slidably mounted on said elongated metal members and providing bearing surfaces for said valve stem and spaced parallel to each other by spacer members removably mounted on said elongated metal members and removable means at the ends of said elongated metal members for retaining said cross-members, spacer members and valve stem moving means in position during operation of said device, whereby on removal of said removable means the cross-members, spacer members, valve stem moving means and valve stem are readily disassembled.

2. A device for continuously releasing from a pressure-resistant container hot fluids which are under high pressure and which contain materials that are solid at room temperatures comprising a pressure-resistant tube, a valve body provided with a valve seat having a circular orifice, means for connecting said valve body and said tube, means for heating said valve body, a rotatable valve stem positioned externally of said valve body and having a tapered tip of circular cross-section positioned adjacent said valve seat, the longitudinal axis of said valve stem being substantially coincident with the longitudinal axis of said valve seat orifice, detachable means on said valve stem for continuously rotating said valve stem about its longitudinal axis, detachable means for adjustably moving the tip of the valve stem toward said valve seat, said valve stem being pressed away from said valve seat by the fluid pressure in said tube when said stem moving means is retracted, rigidly supported elongated metal members on opposite sides of said valve stem positioned parallel to said valve stem, the longitudinal axis of said members lying in the same plane as the longitudinal axis of said valve stem and orifice, at least two cross-members slidably mounted on said elongated metal members and providing bearing surfaces for said valve stem, said cross-members being spaced apart and parallel to each other by spacer members removably mounted on said elongated metal members and removable means at the end of said elongated metal members for retaining said cross-members, spacer members and valve stem moving means in position during operation of said device, whereby on removal of said removable means the cross-members, spacer members, valve stem moving means and valve stem are readily disassembled.

3. A device for continuously releasing from a pressure-resistant container hot fluids which are under high pressure and which contain materials that are solid at atmospheric temperatures, as described in claim 2, but further characterized in that said valve seat and said tapered tip are made of cemented tungsten carbide.

4. A device for continuously releasing from a pressure-resistant container hot fluids which are under high pressure and which contain materials that are solid at atmospheric temperatures, as described in claim 2, but further characterized in that said valve body is electrically heated.

5. A device for continuously releasing from a pressure-resistant container hot fluids which are under high pressure and which contain materials that are solid at atmospheric temperatures, as described in claim 2, but further characterized in that it also comprises means for separating solid materials from the gases released through the orifice of the valve seat.

6. A device for continuously releasing from a pressure-resistant container hot fluids which are under high pressure and which contain materials that are solid at room temperatures comprising a pressure-resistant tube, a valve body removably connected to said tube and having a passageway communicating with the hollow space in said tube, a second pressure-resistant tube having one end thereof removably connected to said valve body and communicating with the passageway in said valve body and having a valve seat of cemented tungsten carbide with a circular orifice therein in the other end thereof, said tubes and valve body being capable of withstanding a pressure above 2000 pounds per square inch, means for electrically heating said valve body, a rotatable substantially cylindrical valve stem positioned externally of said valve body and tubes and having a tapered tip composed of cemented tungsten carbide positioned adjacent said valve seat, the longitudinal axis of said valve stem being substantially coaxial with said valve seat orifice, two rigidly supported rods on opposite sides of said valve stem and parallel thereto, the longitudinal axes of said rods lying in the same plane as the longitudinal axis of said valve stem and orifice, two cross-members slidably mounted on said rods and providing bearing surfaces for said valve stem, said cross-members being spaced apart and parallel to each other by spacer members removably mounted on said rods, means removably mounted on said rods for adjustably moving the tip of the valve stem toward said valve seat, said valve stem being pressed away from said valve seat by the fluid pressure in said second mentioned tube when said stem adjusting means is retracted, removable means at the end of said rods for retaining said cross-members, spacer members and valve stem moving means in position during operation of said device, whereby on removal of said removable means from said rods the cross-members, spacer members, valve stem moving means and valve stem are readily disassembled, and means detachably mounted on said valve stem for continuously rotating said valve stem about its longitudinal axis.

References Cited in the file of this patent
UNITED STATES PATENTS

| | | |
|---|---|---|
| 1,323,999 | Baker | Dec. 2, 1919 |
| 1,470,974 | Hardinge | Oct. 16, 1923 |
| 2,325,067 | Marks | July 27, 1943 |
| 2,566,227 | Paden | Aug. 28, 1951 |
| 2,566,231 | Paden | Aug. 28, 1951 |
| 2,575,497 | Mackay | Nov. 20, 1951 |
| 2,582,899 | Barnebey | Jan. 15, 1952 |